Patented Sept. 15, 1936

2,054,731

UNITED STATES PATENT OFFICE

2,054,731

ORGANIC SALTS OF BISMUTH AND PROCESS FOR PRODUCING SAME

Frank Lee Pyman and Alexander Peter Tawse Easson, Nottingham, England, assignors to Boots Pure Drug Company Limited, Nottingham, England, a British company No Drawing. Application June 13, 1935, Serial No. 26,516. In Great Britain June 26, 1934

13 Claims. (Cl. 167—68)

This invention relates to the production of organic bismuth salts which are easily soluble in oil, and more particularly to the production of basic bismuth salts of an alkyl hydrogen cyclohexane-1-1-di-acetate of the general formula $C_6H_{10}(CH_2COOR).CH_2COOH$, where R is an alkyl group.

The injection of solutions of bismuth salts in oil in the treatment of certain diseases is preferred to other forms of bismuth therapy. As the above bismuth salts are easily soluble in oil, they may be used by injection in the form of solutions in oil. For such treatment it is necessary that the solutions should be non-toxic and stable, and preferably yield no deposit of solid matter on standing. It is also desirable that they should be capable of resisting the action of such heat as is necessary to sterilize the solution and that they should not decompose on long keeping at ordinary temperatures especially in the tropics; finally, it is of considerable importance from the commercial point of view that the acids from which such salts are made should be easily obtainable. Basic bismuth salts of the acids specified above satisfy these necessary conditions.

Therefore, according to the present invention, basic bismuth salts of an alkyl hydrogen cyclohexane-1-1-di-acetate acid as referred to above are prepared by a process similar to that set forth in the specification of our British patent No. 397,249 for the production of basic bismuth salts of α-carbalkyloxycyclohexanylacetic acid, that is by a double decomposition between an inorganic basic bismuth salt, such as bismuth sub-nitrate (B. P.), and an alkali salt of the acid in question. The alkali salt may well be formed in situ by the action of an amount of caustic alkali solution equivalent to the acid present in reaction with the acid in question. The reaction is preferably carried out in the presence of the oil which is to be used as the solvent for the organic bismuth salt.

It could not have been foreseen that a basic bismuth salt of such an acid as $C_6H_{10}(CH_2.COOC_2H_5).CH_2COOH$, which is one example of the alkyl hydrogen cyclohexane-1-1-di-acetates and which is very easily made, would yield a solution in oil which is stable, non-toxic and can be sterilized by the action of heat.

As far as is known, the alkyl hydrogen cyclohexane-1-1-di-acetates have not been previously described. They may, however, be prepared by heating cyclohexane-1-1-diacetic anhydride with pyridine and the appropriate anhydrous alcohol, neutralizing the pyridine, extracting the mixture, and removing the acid ester by means of sodium carbonate.

In order that the invention may be clearly understood and readily carried into effect, an example of the preparation of the basic bismuth salts will now be more fully described, together with an example of the preparation of the acids used in the production of the basic bismuth salts.

Example

In the preparation of a solution in olive oil of the basic bismuth salt of ethyl cyclohexane-1-1-di-acetate, a mixture of 80 parts by weight of the monoethyl ester of cyclohexane-1-1-diacetic acid, 540 parts of olive oil, and 140 parts of bismuth sub-nitrate are heated over a steam bath in a vessel provided with a stirrer, an air condenser and dropping funnel. While the mixture is being heated and stirred, a solution of 14 parts of caustic soda and 350 parts of water is run in over a period of about 90 minutes, after which the heating and stirring are continued for about 8½ hours. After cooling, the mixture is stirred with a convenient amount of ether, say 500 parts, to dissolve the oil and the bismuth salt soluble in oil, and the mixture is then filtered. The ether layer is separated, dried over anhydrous sodium sulphate, and the ether is evaporated in vacuo. The final oil solution of the bismuth salt may be filtered if necessary.

The following is an example of a method of obtaining the acid used in the above example.

The acid in question may be made by the following process from cyclohexane-1-1-diacetic anhydride, which is described by Thole and Thorpe in the Journal of the Chemical Society, 1911, volume 99, page 446. 72.5 parts by weight of the anhydride are heated together with 47 parts of anhydrous alcohol and 35 parts of pyridine under a reflux condenser over a steam bath for 12 hours. The solution is thereupon cooled, diluted with water, and the pyridine neutralized with hydrochloric acid. The mixture is then extracted with ether and the acid ester removed by shaking with sodium carbonate solution. The alkaline extract is acidified and the acid ester extracted with ether, and it remains as a thick oil after the ether has been removed.

By using alcohols other than ethyl alcohol in the above process for producing the acid, other homologous acids may be prepared by similar reactions, and these acids may be used in carrying out the present invention in producing basic bismuth salts of other acids of the class referred to above.

We claim:—

1. The process for the production of an organic basic bismuth salt soluble in oil, consisting in effecting a double decomposition between a basic bismuth compound and an alkali salt of a mono-alkyl ester of cyclohexane-1-1-diacetic acid.

2. The process for the production of an organic basic bismuth salt soluble in oil, consisting in effecting a double decomposition between an inorganic basic bismuth salt and an alkali salt of a mono-alkyl ester of cyclohexane-1-1-diacetic acid.

3. The process for the production of an organic basic bismuth salt soluble in oil, consisting in effecting a reaction between an inorganic basic bismuth salt, a mono-alkyl ester of cyclohexane-1-1-diacetic acid and an amount of caustic alkali solution equivalent to the amount of said acid.

4. The process for the production of an organic basic bismuth salt soluble in oil, consisting in effecting a double decomposition between a basic bismuth compound and an alkali salt of a mono-alkyl ester of cyclohexane-1-1-diacetic acid in the presence of an oil in which the resulting bismuth salt is soluble.

5. The process for the production of an organic basic bismuth salt soluble in oil, consisting in effecting a reaction between an inorganic basic bismuth salt, a mono-alkyl ester of cyclohexane-1-1-diacetic acid and an amount of caustic alkali solution equivalent to the amount of said acid in the presence of an oil in which the resulting bismuth salt is soluble.

6. The process for the production of an organic basic bismuth salt soluble in oil, consisting in effecting a reaction between bismuth sub-nitrate, a mono-alkyl ester of cyclohexane-1-1-diacetic acid and an amount of caustic soda solution equivalent to the amount of said acid.

7. The process for the production of an organic basic bismuth salt soluble in oil, consisting in effecting a reaction between bismuth sub-nitrate, a mono-alkyl ester of cyclohexane-1-1-diacetic acid and an amount of caustic soda solution equivalent to the amount of said acid in the presence of an oil in which the resulting bismuth salt is soluble.

8. The process for the production of an organic basic bismuth salt soluble in oil, consisting in effecting a reaction between bismuth sub-nitrate, a mono-alkyl ester of cyclohexane-1-1-diacetic acid and an amount of caustic soda solution equivalent to the amount of said acid in the presence of olive oil.

9. The process for the production of an organic basic bismuth salt soluble in oil, consisting in effecting a reaction between bismuth sub-nitrate, the monoethyl ester of cyclohexane-1-1-diacetic acid and a caustic alkali solution.

10. The process for the production of an organic basic bismuth salt soluble in oil, consisting in effecting a reaction between bismuth sub-nitrate, the monoethyl ester of cyclohexane-1-1-diacetic acid and an amount of caustic soda solution equivalent to the amount of said ester.

11. The process for the production of an organic basic bismuth salt soluble in oil, consisting in effecting a reaction between bismuth sub-nitrate, the monoethyl ester of cyclohexane-1-1-diacetic acid and an amount of caustic soda solution equivalent to the amount of said ester in the presence of olive oil.

12. A composition of matter consisting of a basic bismuth salt of a mono-alkyl ester of cyclohexane-1-1-diacetic acid, in solution in olive oil suitable for injections.

13. A composition of matter consisting of a basic bismuth salt of the monoethyl ester of cyclohexane-1-1-diacetic acid, in solution in olive oil suitable for injections.

FRANK LEE PYMAN.
ALEXANDER PETER TAWSE EASSON.